Dec. 29, 1931.   D. H. BOTTRILL   1,838,357
SOLDERING DEVICE
Filed May 18, 1929
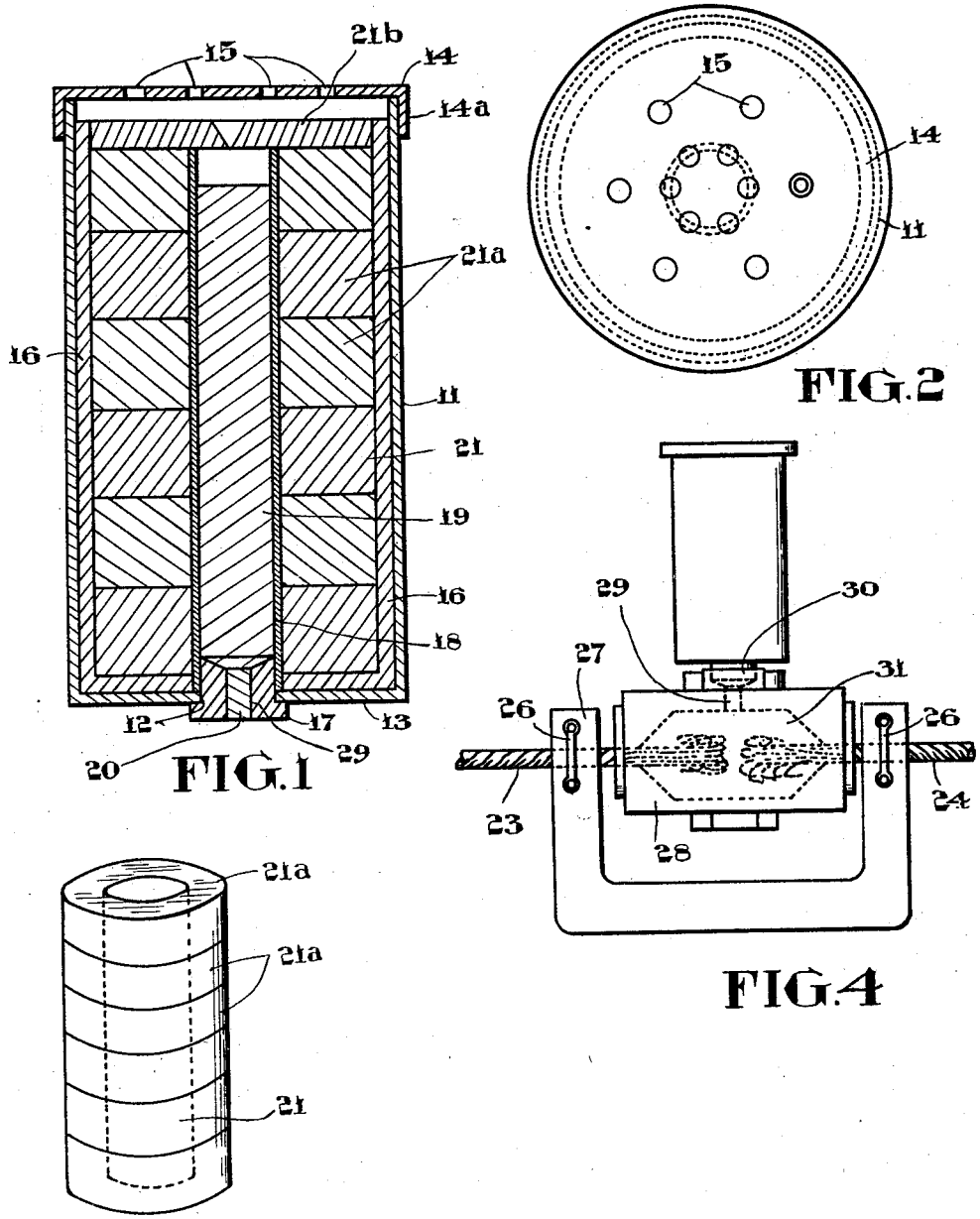
INVENTOR
DAVID.H.BOTTRILL
BY Fetherstonhaugh&Co
ATTORNEYS Patented Dec. 29, 1931

1,838,357

UNITED STATES PATENT OFFICE

DAVID HUGHES BOTTRILL, OF MONTREAL, QUEBEC, CANADA

SOLDERING DEVICE

Application filed May 18, 1929. Serial No. 364,301.

This invention relates to new and useful improvements in soldering devices and the object of the invention is to provide a soldering device in convenient form which will simplify the soldering or welding of the adjacent ends of wires, pipes or the like together.

According to my invention, I provide an outer container and an inner container. The outer container is lined with a refractory material while the inner container is adapted to hold a charge of soldering or joining material. A plug is pressed into the lower end of the inner container and is provided with an aperture through which the soldering material in its fluid state flows. Between the inner wall of the outer container and the outer wall of the inner container, a heat generating unit of the exo-thermic type is placed. This unit is made in the form of a series of rings of a compressed exo-thermic mixture. The aperture in the plug is filled with a material having a slightly higher melting temperature than the soldering material to ensure that the said soldering material is in a fluid state before being discharged through the aperture. An ignition disc of the compressed exo-thermic material rests on the top of the inner cylinder and a perforated cap is provided to allow the gases of combustion to escape.

In the drawings which illustrate my invention.

Figure 1 is a sectional elevation of my improved soldering device.

Figure 2 is a plan view of the device shown in Figure 1.

Figure 3 is a perspective view of the heat generating unit showing how it is built up of sections.

Figure 4 is a side elevation showing one application of the device as used for making a connection between the adjacent ends of a cable.

Referring more particularly to the drawings, 11 designates the outer container open at the top and having an aperture 12 formed in the bottom 13 thereof. The said container is preferably made cylindrical and is provided with a removable cap or cover 14, the flanges 14a of which frictionally engage with the outer wall of the cylinder. Perforations 15 are formed in the cover. The inner wall and bottom of the outer container is lined with a refractory material 16. A flanged plug 17 fits into the aperture in the container and projects upwardly therethrough to engage with the inner wall of an inner container 18, the bottom of which rests on the bottom of the outer container. The inner container is adapted to hold a fusible alloy 19 of any suitable character. The plug fits tightly into the inner cylinder and holds it concentric with the outer cylinder and spaced from the inner wall thereof. The plug is provided with an aperture or outlet 20 which is filled with a fusible material 29, the melting or fusing point of which is much higher than the fusible alloy 19. The space between the outer wall of the inner cylinder and the inner wall of the outer cylinder is adapted to contain a heat generating unit 21. This unit is preferably made in sections 21a of ring form and made from compressed exo-thermic material adapted when ignited to generate sufficient heat to first melt the fusible alloy 19 and then the material 29. The heat generating units 21 preferably consists of a mixture of aluminum, iron oxide, magnesium and potassium nitrate. This automatically ensures that the fusible alloy 19 is in a proper state for making an efficient joint before being released from the confines of the inner container. An ignition disc 21b is provided. This disc is made of compressed heat generating material preferably of the same character as the heat generating units 21a above referred to. This disc is provided so that should the sections 21a not extend up to the top of the wall of the inner cylinder, the burning thermite or like disc will fall on to the uppermost section 21a and ignite same. This feature allows a certain amount of flexiblity in the use of the device as any number of sections 21a may be used, said number being controlled by the amount and class of fusible material 19 being used.

In Figure 4, I have shown one application of the device and this will explain the operation thereof. In this figure, 23 and 24 are the adjacent ends of cables which it is desired to connect by a soldered or welded joint. To ensure that the soldering material will make proper contact with the ends of the cable, it will be seen that the wires forming the cable at said ends are spread and bent over in the form of hooks. The cables are clamped by any suitable means 26 to a U-shaped member to hold them a set distance apart, while making the joint. In making the joint, I prefer to use a split mould 28 having a central chamber 31 of sufficient size to allow molten material to flow around the adjacent ends of the cable and form a connection therewith when cold. No detail of the parts forming the mould is shown as the use of split moulds is common practice and any of the well known types may be used. The wires extend into the chamber. The chamber has a recessed portion 30 adapted to receive the plug 17 and hold the aperture therein in registered relation with a hole 29 communicating with the chamber. The quantity of fusible alloy 19 within the device is sufficient to fill the mould and make the joint. The exo-thermic mixture is ignited and generates sufficient heat to melt the alloy. When the alloy is in its molten state, the material in the aperture in the plug fuses and falling out allows the fusible alloy 19 to flow into the chamber and surround each and all of the wires. The molten alloy is then allowed to cool after which the mould is removed and the connection is thus made between the cable ends.

It will be seen that the device is very simple to operate and provides a portable soldering device which may be quickly and easily set up to position for melting fusible alloy and directing same for making joints between wires, cables or the like.

The device is inexpensive to manufacture and may be safely handled or transported to the desired joint location as the compressed exo-thermic mixture requires to come in contact with a very high degree of heat or submitted to temperatures of over 1700° F. before it will ignite.

Having thus described my invention, what I claim is:

1. In a soldering device, an outer container open at the top and lined with a refractory material, a flanged plug having a central aperture, said plug being adapted to pass through the bottom and project into the container, a tubular element engaging with the plug projection within the casing and heat generating means between the tubular element and the inner wall of the casing.

2. In a soldering device, an outer container lined with refractory material, an apertured plug extending through the bottom of the container and projecting thereinto, a tubular element within the container and engaging with the plug, a fusible alloy within the element, fusible means in the aperture of the plug to hold the fusible alloy in the tube until it has reached its fluid state under the action of heat transfer, and compressed exo-thermic means between the tubular element and the casing adapted when ignited to melt the alloy.

3. A device according to claim 2 in which the compressed exo-thermic means comprises a plurality of rings of a compressed exo-thermic mixture and exo-thermic means for igniting the rings.

4. In a soldering device, an outer container lined with refractory material, a perforated cover for the container, an apertured plug extending through the bottom of the casing into the container, a tubular inner container engaging with the plug within the outer container, rings of a compressed exo-thermic mixture surrounding the tubular container, an ignition disc of a compressed exo-thermic mixture resting on the tubular container, a fusible element within the aperture, said element having a higher melting temperature.

5. A soldering device including an outer container, a fusible alloy container arranged centrally within the outer container, an apertured plug projecting within the outer container through the bottom thereof and received by the alloy container, a plurality of heat generating units surrounding the alloy container, and an ignition disk supported adjacent the upper end of the outer container.

In witness whereof, I have hereunto set my hand.

DAVID HUGHES BOTTRILL.